(12) United States Patent
Hoenstine et al.

(10) Patent No.: US 9,707,697 B1
(45) Date of Patent: Jul. 18, 2017

(54) LIVESTOCK GUARD APPARATUS, SYSTEMS AND METHODS

(71) Applicant: CATTLE GUARD FORMS.COM, LLC, Tallahassee, FL (US)

(72) Inventors: James M. Hoenstine, Tallahassee, FL (US); Daniel L. Fox, Ocala, FL (US)

(73) Assignee: CATTLE GUARD FORMS.COM, LLC, Tallahassee, FL (US)

( * ) Notice: Subject to any disclaimer, the term of this patent is extended or adjusted under 35 U.S.C. 154(b) by 592 days.

(21) Appl. No.: 14/473,440

(22) Filed: Aug. 29, 2014

Related U.S. Application Data

(63) Continuation-in-part of application No. 13/644,604, filed on Oct. 4, 2012, now abandoned.

(60) Provisional application No. 61/544,302, filed on Oct. 7, 2011, provisional application No. 61/650,643, filed on May 23, 2012.

(51) Int. Cl.
  *B28B 1/14* (2006.01)
  *A01K 3/00* (2006.01)
  *E01C 9/00* (2006.01)

(52) U.S. Cl.
  CPC .............. *B28B 1/14* (2013.01); *A01K 3/002* (2013.01); *E01C 9/001* (2013.01)

(58) Field of Classification Search
  CPC ... B29C 36/29; E04B 2/84; E04B 5/18; E04B 2005/173; E04B 2005/322; B28B 1/14; B28B 7/18; A01K 3/002; E01C 9/001
  USPC ........ 425/253, 167; 249/124, 142, 163, 167, 249/177, 35, 122, 155, 156, 165, 147, 249/176, 1–10, 18–51; 52/742.1–742.16, 52/745.01, 745.05–745.08; 264/30–35; 404/72–82, 96
  See application file for complete search history.

(56) References Cited

U.S. PATENT DOCUMENTS

| | | | | |
|---|---|---|---|---|
| 3,469,816 A | * | 9/1969 | Gehlbach | E04F 15/08 249/118 |
| 3,915,422 A | * | 10/1975 | Nobbe | B28B 7/0029 249/134 |
| 4,387,882 A | * | 6/1983 | Mansour | A01K 3/002 256/17 |
| 4,434,975 A | * | 3/1984 | Tompkins | A01K 3/002 256/17 |

OTHER PUBLICATIONS

NPL-1. James F. Hoy. The Cattle Guard: Its History and Lore. 1982. Lawrence: University of Kansas Press. pp. 145-146.*

* cited by examiner

*Primary Examiner* — Matthew Daniels
*Assistant Examiner* — Leith S Shafi
(74) *Attorney, Agent, or Firm* — Allen Dryer Doppelt & Gilchrist

(57) ABSTRACT

Several embodiments of livestock guards are disclosed that utilize pre-fabricated forms that are transported to the installation site and are then either filled with a settable material such as concrete or a settable foam, or alternatively is assembled from basic guard units that are fitted together to define the assembled livestock guard.

7 Claims, 16 Drawing Sheets

LIVESTOCK GUARD APPARATUS, SYSTEMS AND METHODS

CROSS-REFERENCE TO RELATED APPLICATION

This application is a continuation-in-part of U.S. patent application Ser. No. 13/644,604 filed Oct. 4, 2012, which claims the benefit of U.S. Provisional Application Ser. No. 61/544,302 filed on Oct. 7, 2011, and U.S. Provisional Application No. 61/650,643 filed on May 23, 2012, the contents of which applications are herein incorporated by reference in their entirety.

BACKGROUND OF THE INVENTION

Livestock guards, often referred to as "cattle guards," are used as an obstacle to prevent livestock from passing through an opening in fencing that surrounds a pasture or the like, and are usually installed where roads or walkways cross a fence line, often at a boundary between public and private lands. Cattle guards are used as an alternative to gates that need to be opened and closed every time a vehicle passes, and are common where roads cross open moorland, rangeland or common land maintained for grazing.

Conventional cattle guards in most instances require that a pit be dug adjacent the fence through which the cattle guard is to be installed. The pit is covered by a transverse grid of bars or tubes, normally made of metal and firmly fixed to the ground on either side of the pit with spaces between the bars. The spaces are sufficiently narrow not to prevent a wheeled vehicle from crossing the pit. Cattle will generally not cross the cattle guard since the spaces do not provide adequate footing.

For conventional cattle guards that do not require a pit, expensive mechanical features are required. These mechanical features may wear out and also may be subject to mechanical failure. Further, typical cattle guards that do not require a pit are often complex in nature and generally not practical for everyday use. Current cattle guards, as described in the prior art, are pre-assembled and transported to the installation location. The cost of transportation and installation may be high in such circumstances. Therefore, there is a need in the field for cattle guards that may be assembled and installed in a rapid and economical fashion.

SUMMARY OF THE INVENTION

The several embodiments of the present invention are directed to cattle guard apparatus, systems and methods.

In first and second embodiments, the cattle guards are fabricated in situ using a form unit that is transported and placed across the driveway, walkway or other opening in a fence, with the cattle guard unit being used as a form for the depositing of concrete, high-density foam or other settable material capable of providing structural integrity to the form.

In the first embodiment, a form unit is shaped by molding a high impact plastic material or shaped from a lightweight metal with elongated hollow rails having spaces between the rails sufficient to deter cattle from crossing the resulting guard. The unit is molded with a series of interior elongated reinforcing rods, preferably formed from a high tensile strength glass fiber, installed both longitudinally and laterally through the molded unit and suspended so as to permit the flow of a settable material into the interior of the unit at the time the cattle guard is being installed. A plurality of openings along the top of each rail permits access to the interior of the unit so that the settable material can be injected therein. Preferably, a removable barrier or blocking such as Styrofoam or similar material is installed in the space between adjacent rails, to prevent the settable material from entering the space during the pour of the settable material into the unit at the installation.

In the second embodiment, the cattle guard is installed at a location where heavy equipment such as tractors or the like will not be required to pass through the fence. Accordingly, in the second embodiment the molded form unit has channels into which the concrete or other setting material may be injected, usually without reinforcing rods.

In a third embodiment, a basic cattle guard unit is provided having side rails and corners between adjacent side rails with a plurality of guard rails molded with and extending above the side rails. The guard rails are molded at a substantial angle between the side rails and are separated by stringers so as to define intervening grooves between adjacent guard rails. The angular disposition of the guard rails permits vehicles to pass across the top of the unit without destructive loading. Additionally, raised areas at respective corners extend approximately to the same height as the guard rails with directional arrows molded into the unit adjacent one of the raised areas to provide assistance in fitting cattle guard units together. One or more of the cattle guard units are placed in a pit extending through a fence, to restrict the movement of cattle and other animals through the fence.

Other features of the various embodiments will be disclosed in greater detail below and in the accompanying drawings.

DESCRIPTION OF DRAWINGS

For a fuller understanding of the nature and advantages of the present invention, reference should be had to the following detailed description taken in connection with the accompanying drawings, in which.

DETAILED DESCRIPTION OF THE PREFERRED EMBODIMENTS

It will be understood that this invention is not limited to the particular apparatus, systems or methods described. It is also understood that the terminology used in the description is for the purpose of describing the particular embodiments, and is not intended to limit the scope of the present invention. Unless defined otherwise, all technical terms used herein have the same meanings as commonly understood by one of ordinary skill in the art. Although any methods and materials similar or equivalent to those described herein can be used in the manufacture, practice or testing of embodiments of the present invention, the preferred apparatus, systems and methods are now described.

It must also be noted that as used herein and in the appended claims, the singular forms "a", "an", and "the" include plural reference unless the context clearly dictates otherwise. "In situ" (or "the site") as referenced herein means carrying out at least a part of the method where the cattle guard is to be installed.

A first embodiment of the present invention will now be described with reference to FIGS. 1-4.

Figure 1:
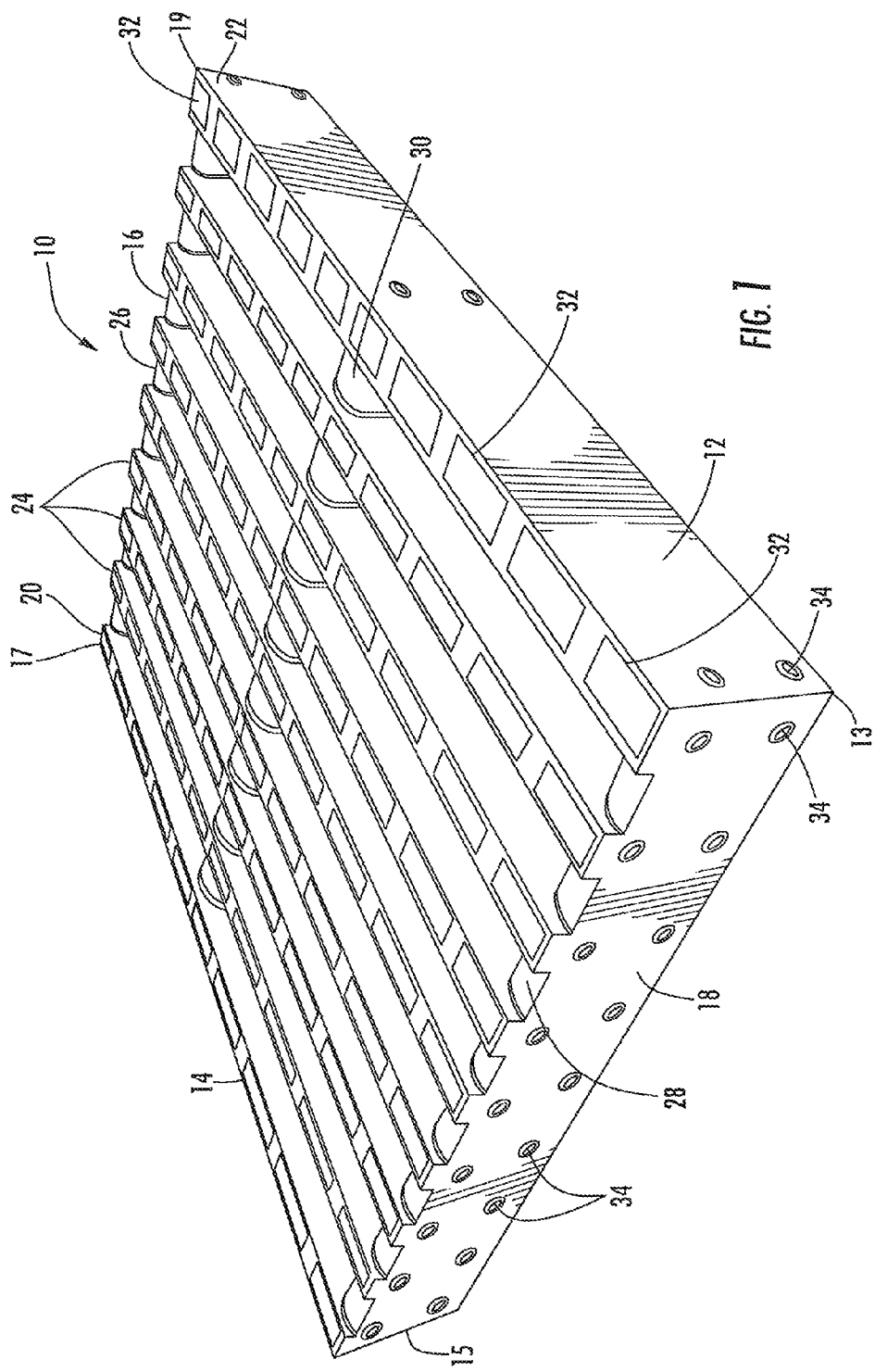
FIG. 1 is a top perspective view of a form unit used in the construction of a cattle guard in accordance with a first embodiment of the present invention.
Figure 2:
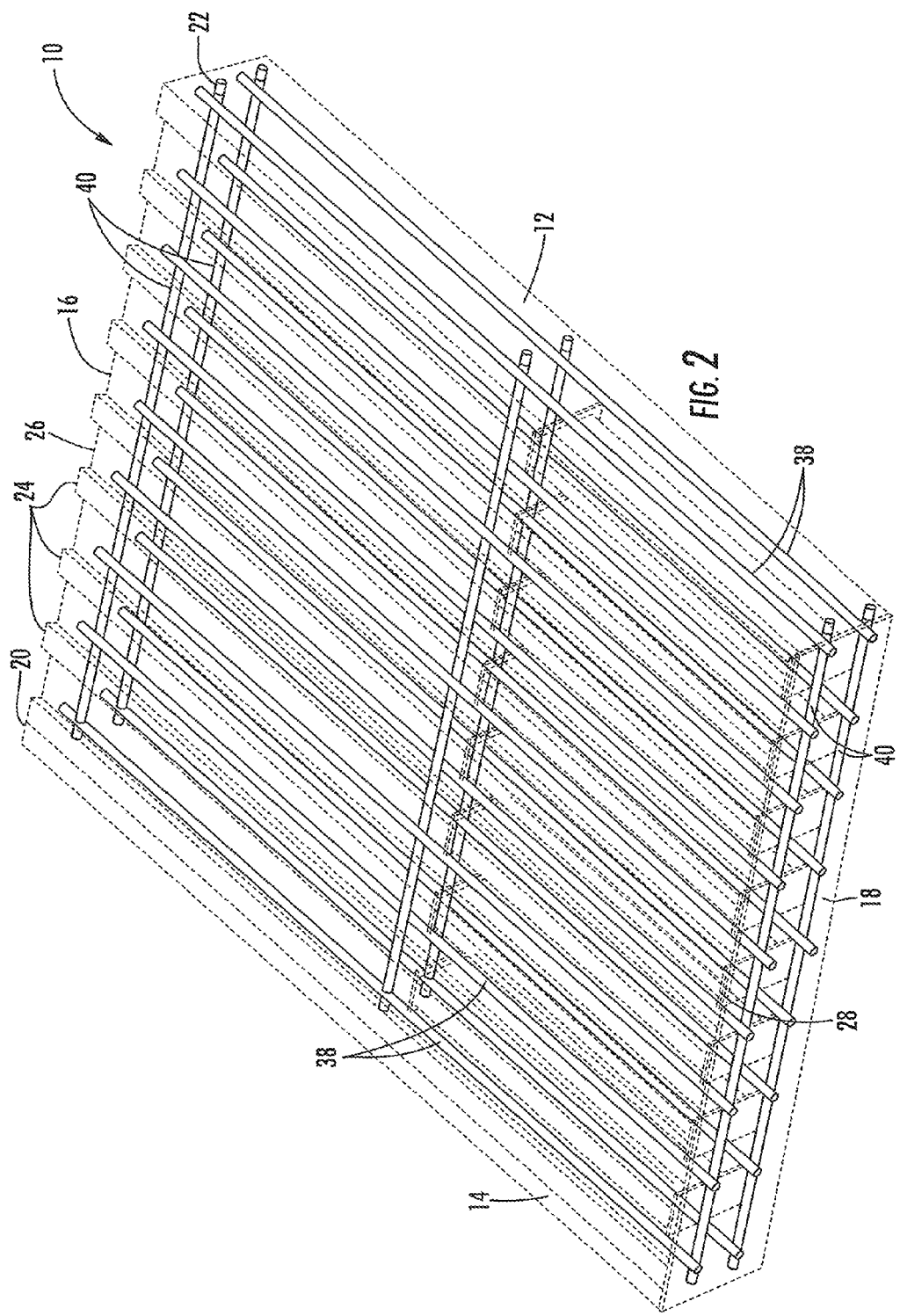
FIG. 2 is a phantom perspective top view of the unit of FIG. 1, illustrating the reinforcing rods installed within the unit.
Figure 3:
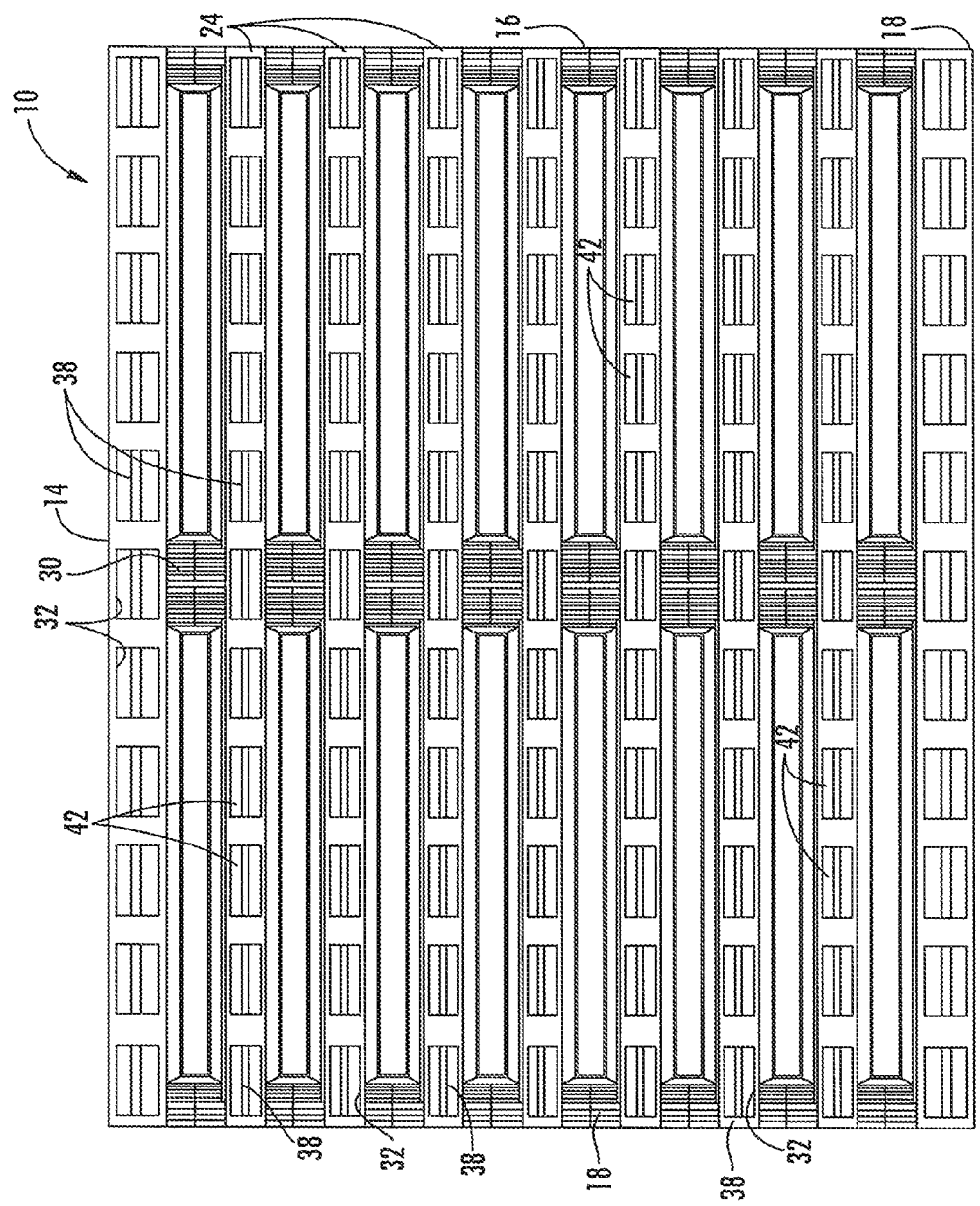
FIG. 3 is a top plan view of the unit of FIG. 1, depicting the layout of openings in the unit of FIG. 1 that permits a flowable media to be injected into the unit and around the reinforcing rods.

Noting FIGS. 1, 2 and 3, the first embodiment incorporates a form unit 10 preferably fabricated from a high impact plastic material such as polyethylene that is molded into a member having a hollow interior and hollow channels defining opposing side rails 12, 14 and opposing end rails 16, 18 with four corners 13, 15, 17 and 19 between adjacent side and end rails. A plurality of longitudinal intermediate rails 24 are spaced between the two side rails 12, 14 and between the end rails 16, 18 across a center rail 30, with each of the rails 12, 14 and 24 having a plurality of rectangular openings 32 across the top surface thereof to permit access to the hollow interior of the unit 10 for injecting a setting material such as concrete or a high density foam, as discussed further below.

As specifically shown in FIGS. 2 and 3, a network of longitudinal reinforcing rods 38 and lateral reinforcing rods 40 are positioned in pairs within the interior of the unit 10. The longitudinal reinforcing rods 38 are suspended in and extend along corresponding ones of the side rails 20, 22 and intermediate rails 24; and the lateral reinforcing rods 40 are suspended in and extend along the end rails 26, 28 and the center rail 30. The rods 38, 40 may be held in place by a variety of techniques, such as fittings 34 that are spun-welded to the side and end rails. Alternatively, suitable connectors (such as EMT connectors, for example) may also be used to hold the rods 38, 40 in place.

It will thus be appreciated by one skilled in the art that the molded form unit 10 of FIGS. 1 and 3 with the internal reinforcing rods 38, 40 of FIG. 2 is appropriately positioned across a fence opening to permit a cattle guard unit having excellent strength and durability to be fabricated in situ by injecting a settable medium 42 (FIG. 3) such as concrete or a high density amorphous foam through the openings 32 along the top of each of the rails 20, 22 and 24, around the grid of reinforcing rods 38, 40 and along the length of each rail, including the end rails 26, 28 and center rail 30. Thereafter, the settable medium 42 is permitted to harden and thus create a unified cattle guard system without the difficulties and expense associated with making the cattle guard at a distant location and shipping it to the site. Preferably, the reinforcing rods 38, 40 are also lightweight in nature and comprise a high-tensile strength glass fiber rebar. The fillable medium 42 may comprise concrete having an appropriate aggregate content such as chad rock of the type used in pumped concrete applications. As an alternative, a high density settable foam may be used in lieu of concrete.

Figure 4:
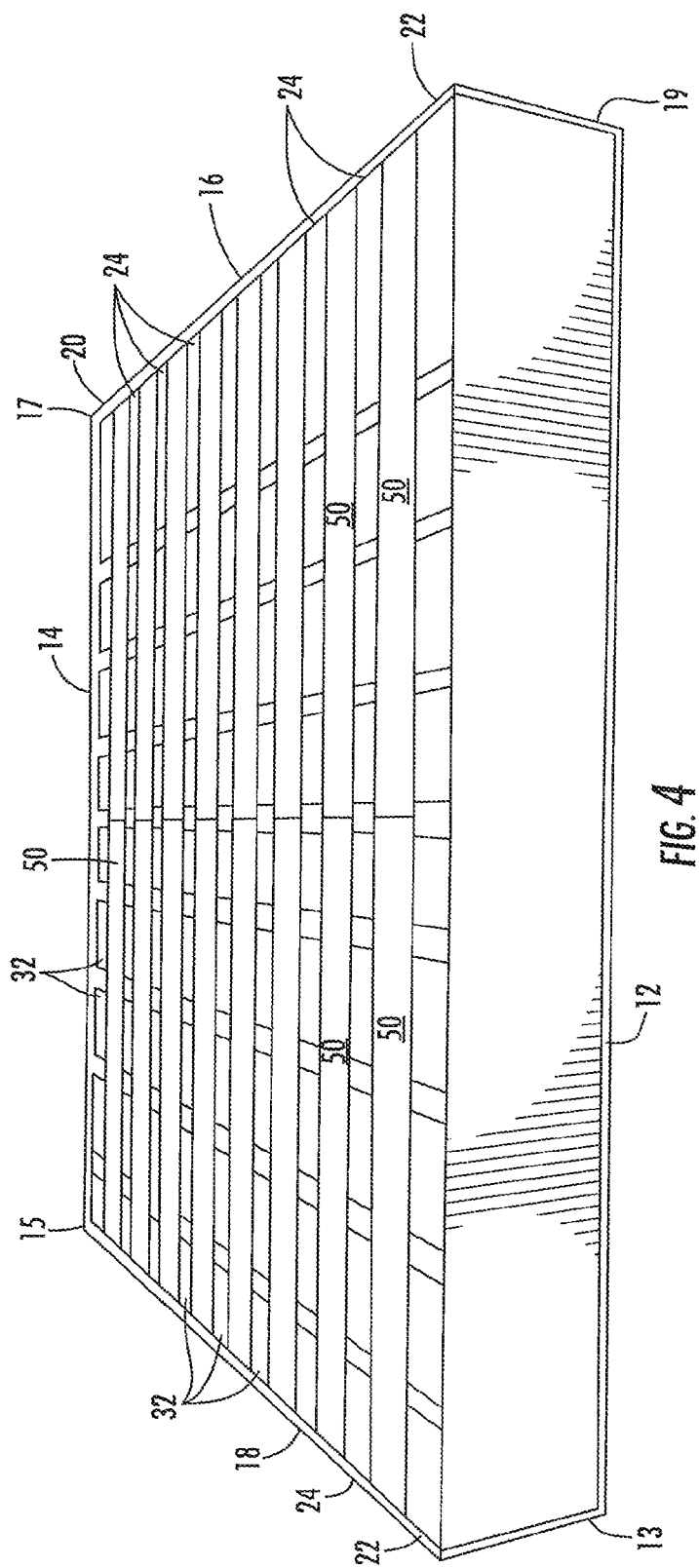
FIG. 4 is a top perspective view of the unit of FIG. 1, illustrating the use of inserts between adjacent rails, to temporarily prevent the fillable material from extending in the space between the rails.

The cattle guard unit made using the form of FIGS. 1-3 has spaces between adjacent rails 20, 22 and 24 that can be passed over by a vehicle, but which discourage cattle from attempting to walk across the unit. The spaces between the adjacent rails 20, 22, and 24 may be wider at the top and become narrower at the bottom. After the molding of the unit 10 and during transportation to an installation site and further during the process of injecting concrete or other appropriate material into the form 10, it is suitable as shown in FIG. 4 to place blocking 50, preferably fabricated of Styrofoam or a similar lightweight material, or temporary barriers along the spaces between adjacent rails 20, 22 and 24 to prevent the settable medium 42 from passing through the space between adjacent rails after the medium is injected into the form unit 10 through the openings 32; thereafter, the Styrofoam blocking 50 are removed.

A second embodiment of the present invention will now be described with reference to FIGS. 5-11.

Figure 5:
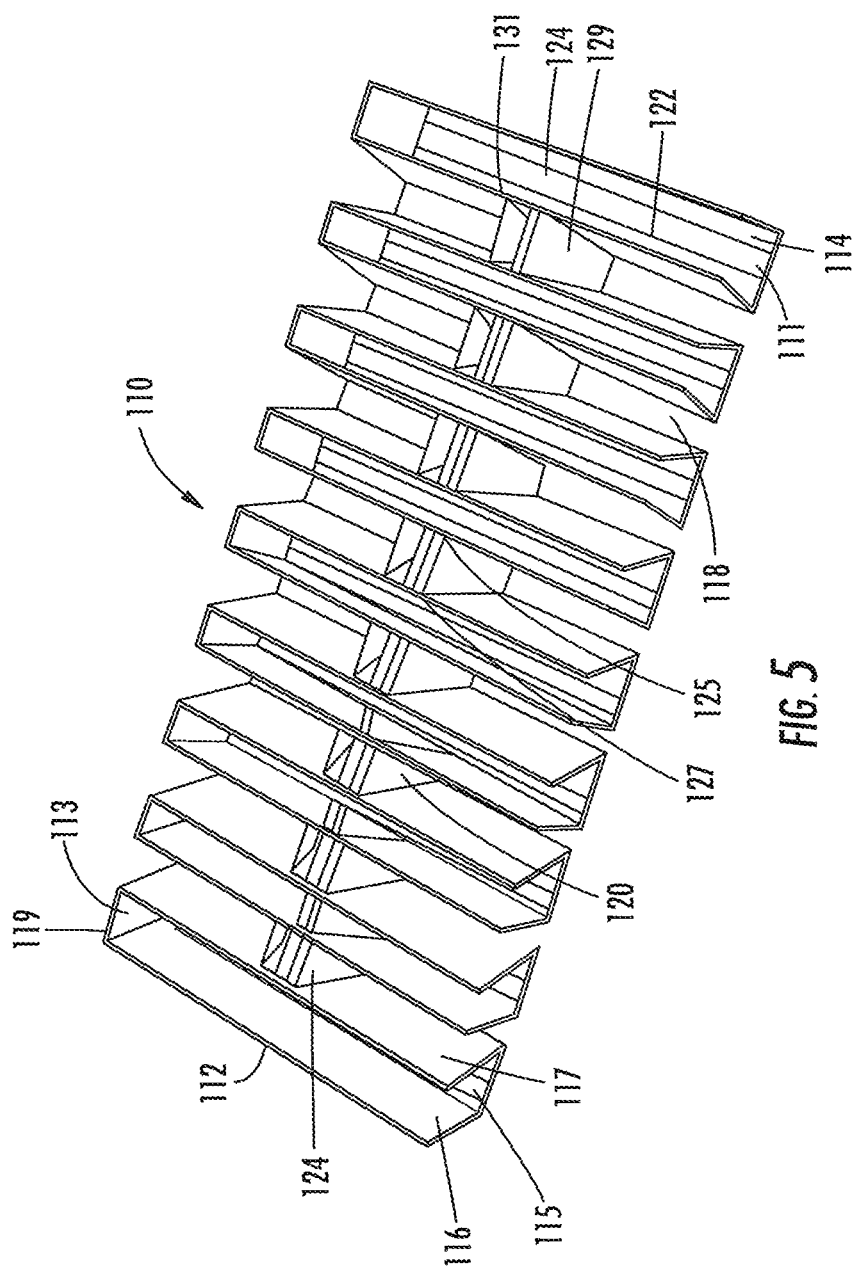
FIGS. 5 and 6 illustrate prospective views of a form unit that is utilized to fabricate a cattle guard in accordance with a second embodiment of the invention.
Figure 6:
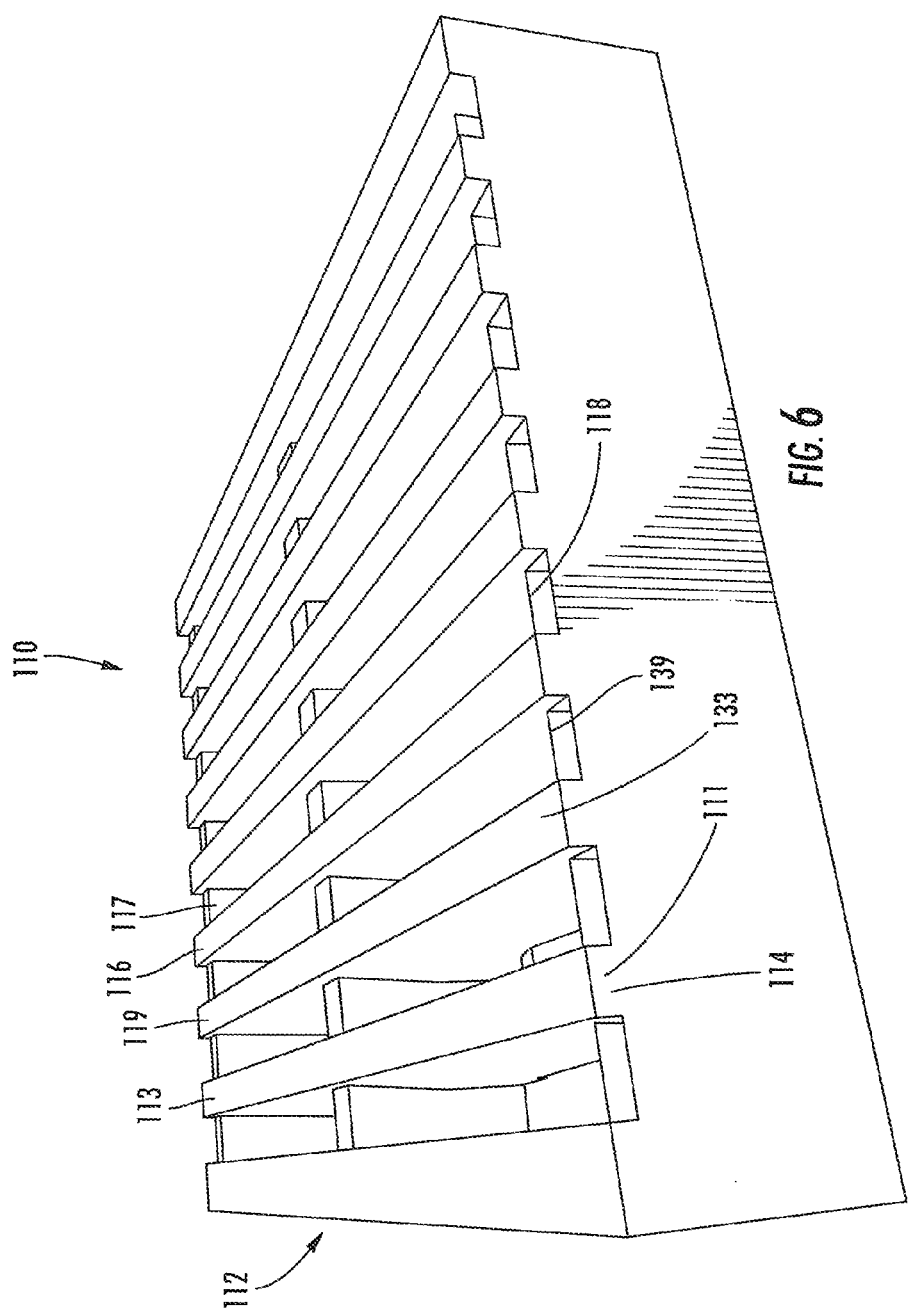

FIGS. 5 and 6 illustrate a form unit 110 that is utilized to also construct cattle guards in situ. Form unit 110 is transported and placed in an end-to-end abutting relationship across or in front of an entry way to a site for confining cattle and other livestock. Form unit 110 is preferably rectangular in shape and is generally constructed of lightweight material that can be easily transported and installed. Non-limiting examples of construction material of form 110 are plastic, wood, composite compounds and aluminum.

Figure 7:
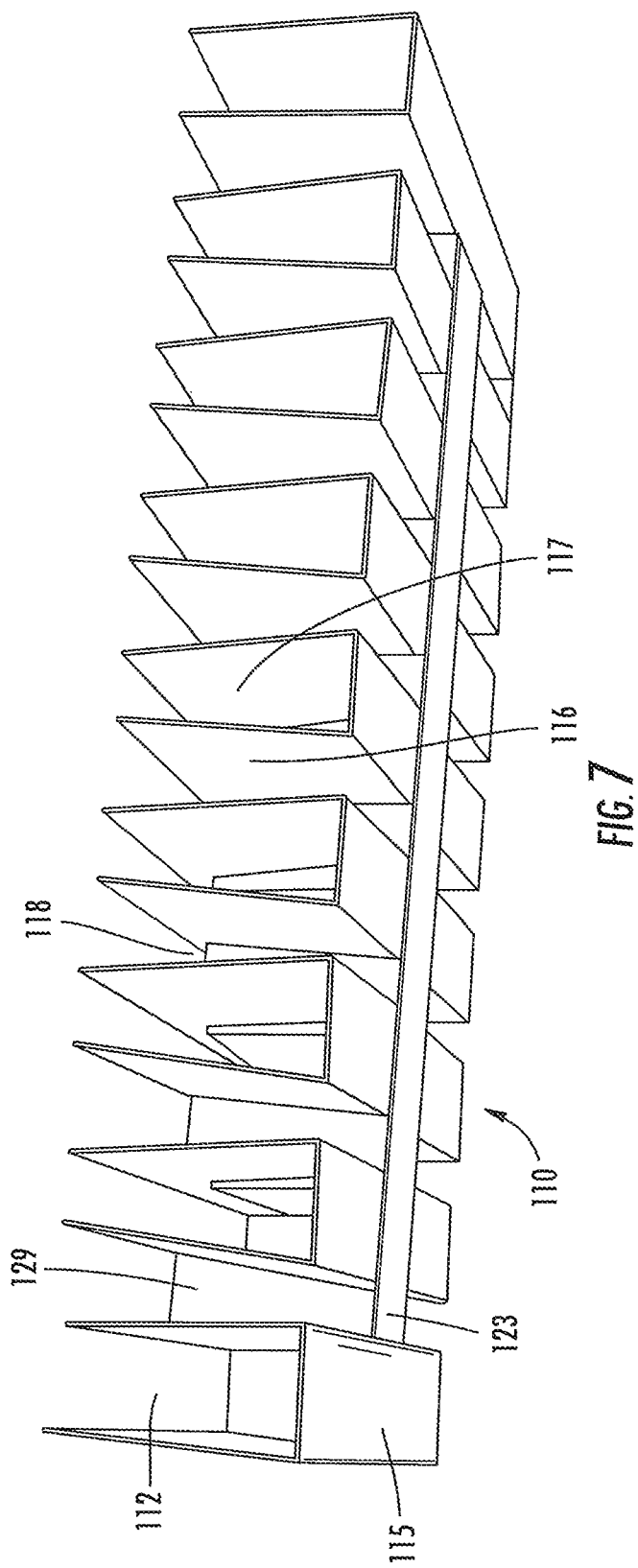
FIG. 7 illustrates a side view of the form unit of FIG. 5.

Referring to FIG. 5, the unit 110 comprises a series of rails 112 that are also referred to herein as "channels". Each channel 112 comprises a proximal end 111 and a distal end 113 that are capped with a proximal cap 114 and a distal cap 119 respectively. Each channel 112 comprises a bottom 115, two opposing sides 116 and 117, and a front side 121 at the proximal end 111 (as depicted in FIGS. 5, 6 and 7). The sides 116, 117 are preferably upwardly convergent and provide a containment volume for cement or other settable medium. A space 118, on the order of 2" to 5" inches, separates each channel 112 from the next, as illustrated in FIGS. 5 and 7, where the space 118 may have downwardly convergent sides in that the top has a greater width than at the bottom of the space 118.

As depicted in FIG. 5, a connecting compartment 120 is placed across each space 118 and connects each channel 112 to the next. The connecting compartment 120 is preferably a rectangular prism and is configured such that it is placed in the center of a length of the channel 112 in space 118.

Each connecting compartment 120 comprises a bottom 123 (as depicted in FIG. 7), two opposing sides 125 and 127, a front side 129 and a back side 131 (as depicted in FIG. 5). In each connecting compartment 120, each of the two opposing sides 125 and 127 are in contact with one of the two opposing sides 116 and 117 of the adjacent channels 112. This allows for the interconnection of the channels 112 with each other through the longitudinal connecting compartment 120. A cavity 133 is placed between side 116 of adjacent channel 112 and side 125 of connecting compartment 120. A cavity 139 is placed between side 117 of adjacent channel 112 and side 127 of connecting compartment 120. Cavities 133 and 139 allow for the interconnection of connection compartments 120 through each channel 112, such that concrete or another settable medium can funnel throughout the channels 112 and connecting compartments 120.

In another version of the second embodiment, where circumstances may require it, reinforcement rods 122 are placed in each channel 112. The reinforcement rods 122 are placed vertically with respect to each other, or one on the top and one directly below, as opposed to being placed side by side of each other. Reinforcement rods 122 run longitudinally along the length of each channel 112 and connect the proximal end 111 to the distal end 113, as depicted in FIG. 5. In yet another aspect of this version, at least two reinforcement rods 124 are placed in a plurality of connecting compartments 120 such that the reinforcement rods 124 run along the width of the connecting compartments 120, from the side 116 of the first channel 112 to the side 117 of the last channel 112 and through all the connecting compartments 120. The reinforcement rods 124 are preferably perpendicular to channel 112, as depicted in FIG. 5.

Another aspect of this invention is directed to the method for fabricating cattle guards in situ using the form unit 110, as depicted in FIGS. 5-7.

Figure 8:
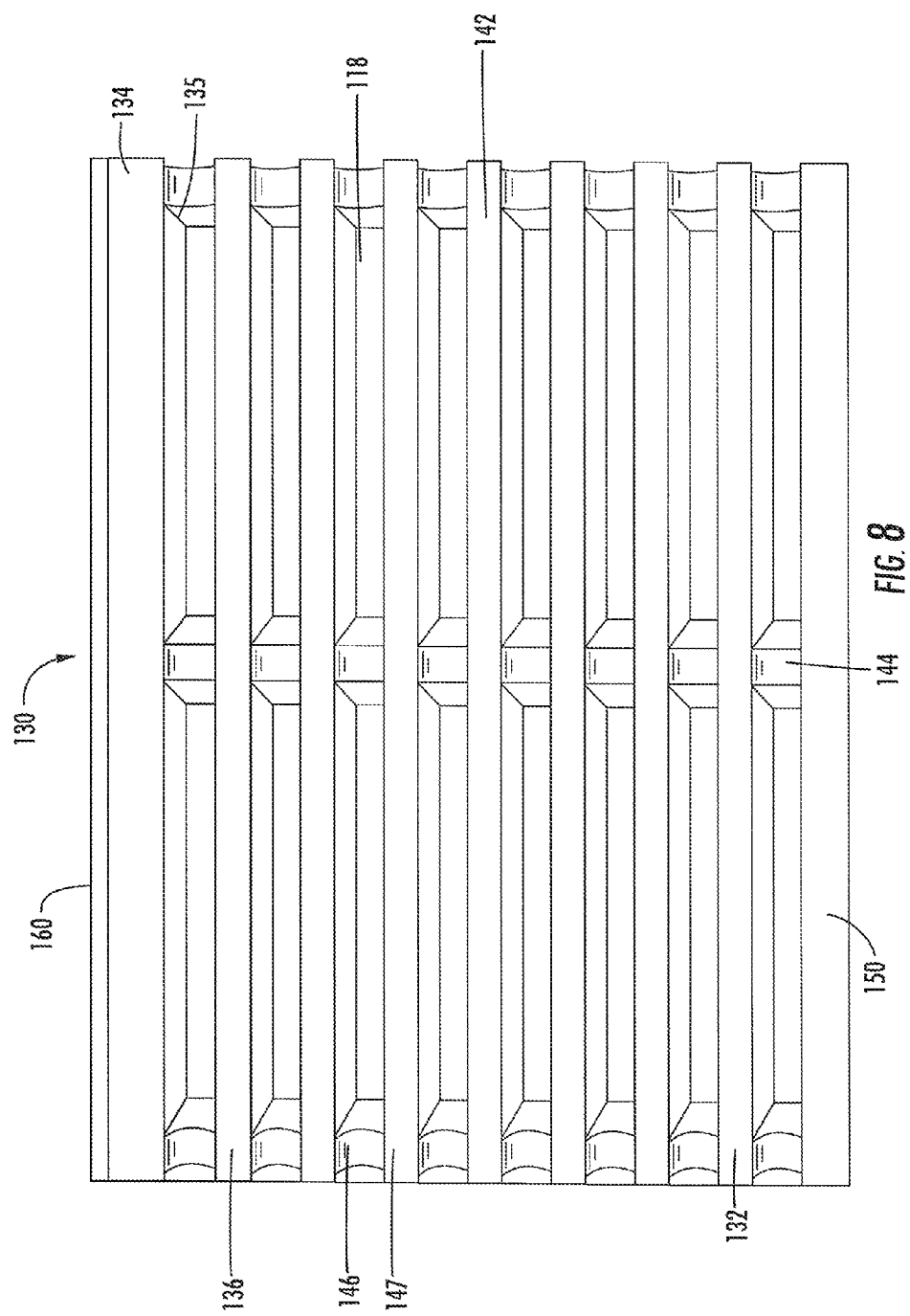
FIG. 8 illustrates a top view of another version of a cattle guard in accordance with the second embodiment of the invention.

A hole at the site of installation of the cattle guard is generally dug corresponding to the depth of the form 110 to allow for leveled and convenient placement. Once the form 110 is placed in an optimal and desirable location, a fillable medium is poured from the top into the form 110, and the form 110 and its contents or high-density foam are simply left in the ground. The end product is a cattle guard 130, as depicted in FIG. 8. As illustrated in FIG. 8, the resulting cattle guard 130 made in the form 110 comprises a series of horizontal, parallel slabs 132, with at least the opposite ends 150 and 160 acting as a deterrent to cattle and other hoofed animals from passing across the cattle guard 130. Each slab 132 is produced by pouring wet concrete or other settable amorphous medium into the channels 112 and compartment 120 of form unit 110 in situ. The concrete preferably has a psi of about 5,000. Referring to FIG. 8, each slab 132 comprises proximal end 134 and distal end 136, a bottom 140, opposing sides 135 and 137, and a top 142. The slab 132 also comprises two opposing sides, a front side 135 and a back side 137. Preferably, the sides 135 and 137 are upwardly convergent. The series of slabs 132 are not overlapping; in fact, space 118 separates each slab 132 from the next, as illustrated in FIG. 8. The space 118 is preferably not large enough for a hoof of a hoofed animal to get completely through. Space 118 has downwardly convergent sides in that the width at the top is wider than the width at the bottom so that the hoof will not be able to reach the bottom of space 118 to obtain footing. Likewise, the hoof will be less likely to get stuck under the cattle guard 130, which might happen were it to pass through the slabs. The top 142 may be rounded in a half-moon shape, which also provides unsuitable footing for hoofed animals and making it virtually impossible for a hoofed animal to walk across.

Referring to FIG. 8, the cattle guard 130 further comprises a connecting slab 144 which is placed in each space 118 and connects each slab 132 to the next. The connecting slab 144 is preferably rectangular and is configured such that it is placed in the center of a length of the slab 132 in space 118. In other words, a connecting slab 144 is placed between side 135 of a slab 132, and side 137 of an adjoining slab 132. This allows for the interconnection of slabs 132 with each other.

Figure 10:
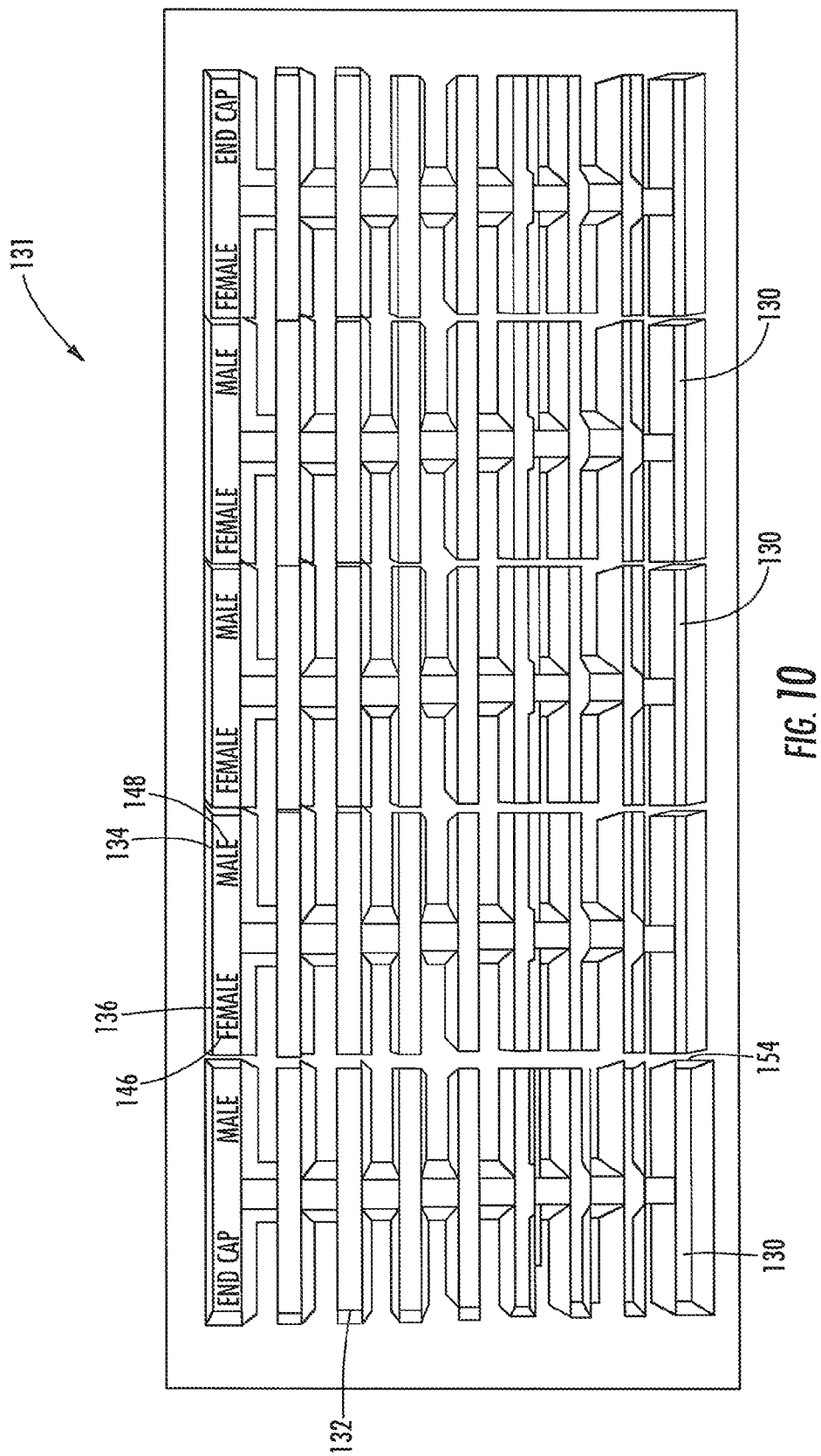
FIG. 10 illustrates a plurality of cattle guards of FIGS. 8 and 9 that are joined to produce a larger cattle guard installation.

Referring to FIG. 10, a series of cattle guards 130 can be placed next to each other to form a larger cattle guard 131. A female connector 146 is placed on the distal end 136 of each slab 132 and a male connector 148 is placed on the proximal side 134 of each slab 132 of the cattle guard 130. The female connector 146 and the male connector 148 may be switched and placed on proximal end 134 and distal end 136, respectively. The cattle guards 130 are joined by the interconnection of the female connector 146 with the male connector 148 and the distal end 136 and the proximal end 138 of the first and last cattle guards 130 are capped with an end cap 150 respectively.

The dimensions of each cattle guard 130 are preferably on the order of about 8' long by 6' wide. The height of the cattle guard is preferably about one foot.

The form unit 110 also may have a bottom 115. This allows for stacking of forms 110 during shipment to reduce cost. In this aspect, the form 110 may be placed on the ground. The proximal end 111, the distal end 113 and the two opposing sides 116 and 117 are reinforced with bolts and straps, such that these ends and sides maintain their shape during the concrete pour. The concrete may be poured into the ground and the cattle guard 130 is shaped by the surrounding walls. In this arrangement, reinforcement bars 122 and 124 and placed on top of the reinforcement bolts and straps.

Figure 9:
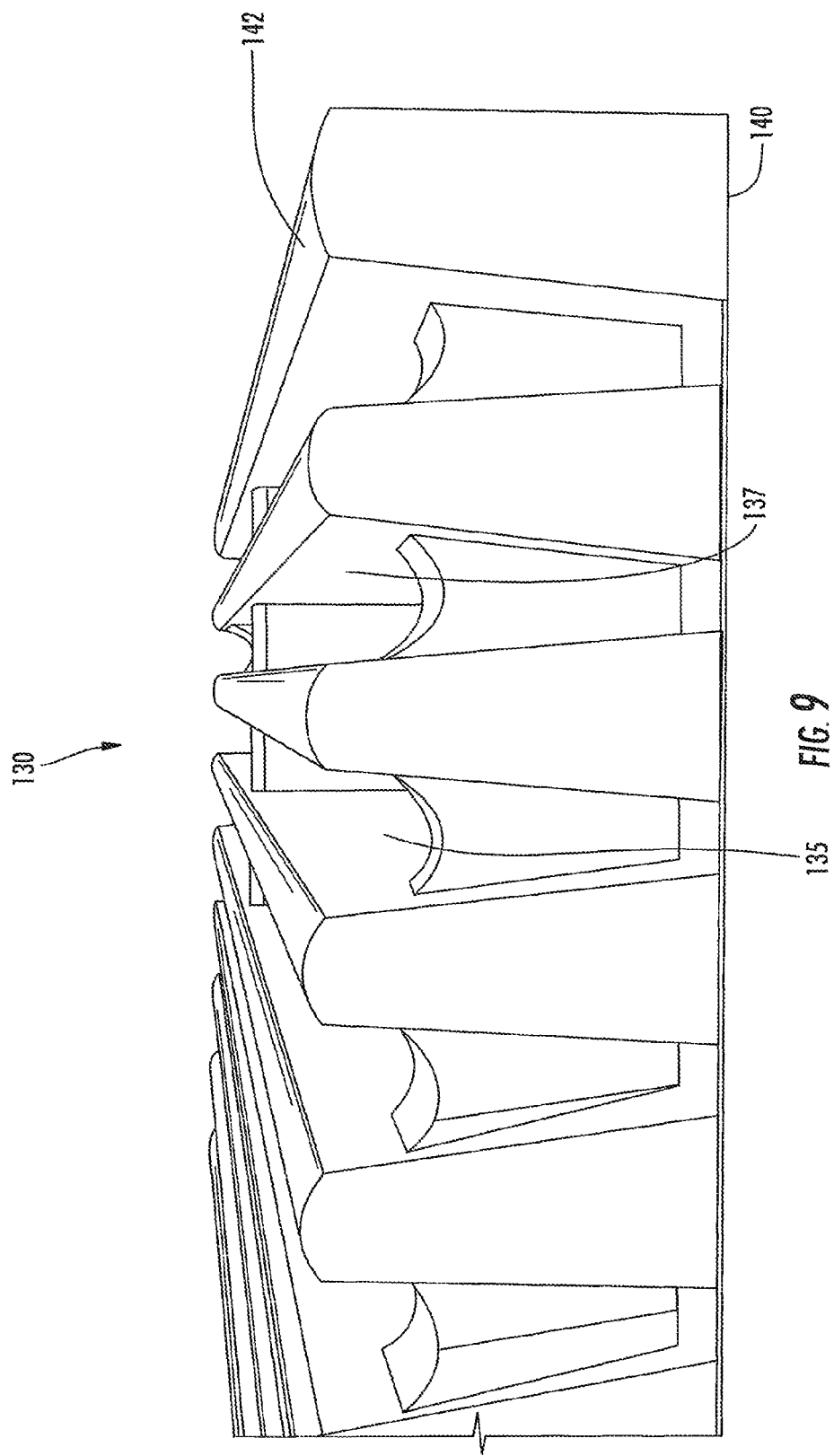
FIG. 9 is a side view of the cattle guard of FIG. 8.
Figure 11:
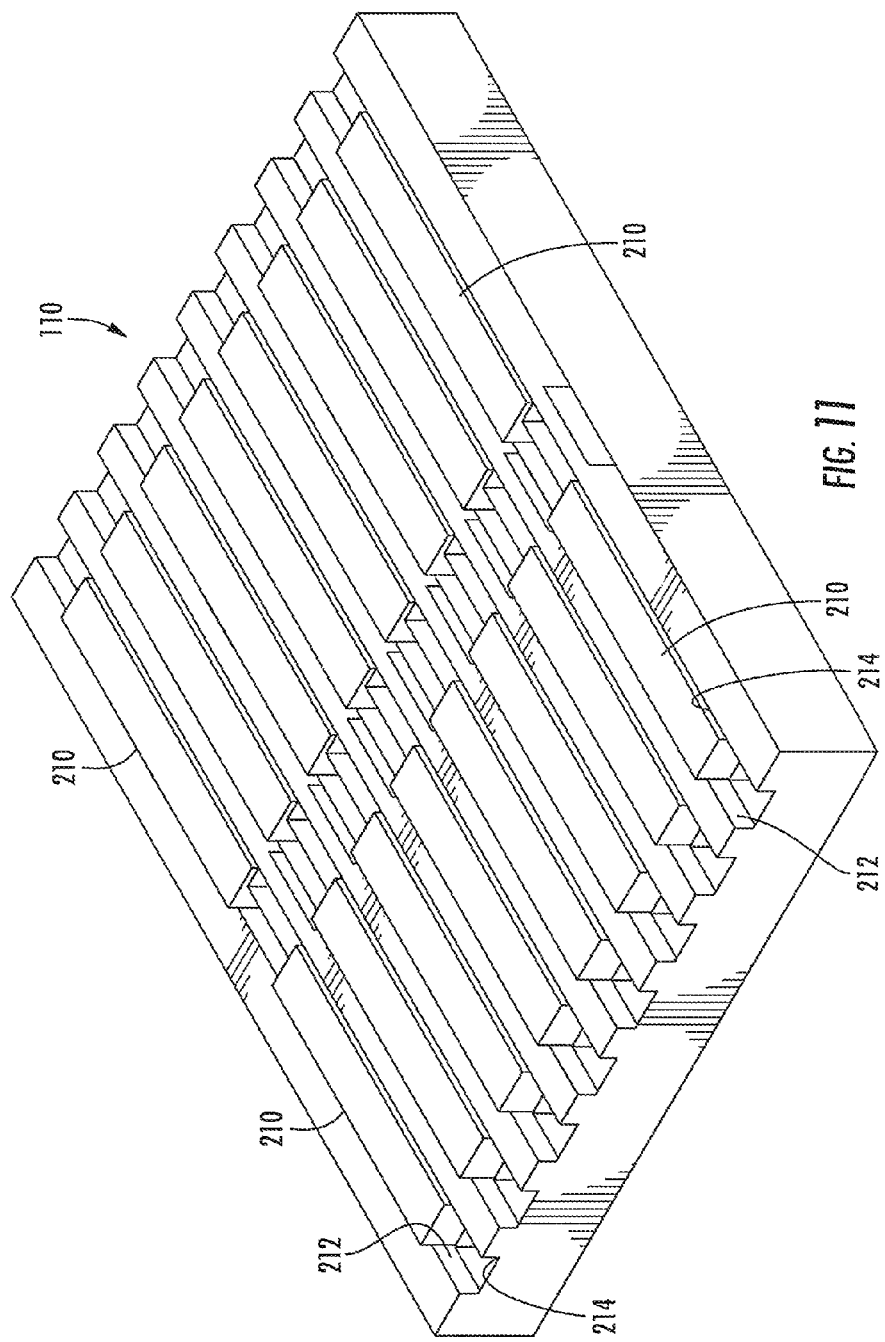
FIG. 11 is a perspective view of a form like that shown in FIG. 6 for fabricating a cattle guard, illustrating the use of temporary blocking during the shipping and pour phases.

Noting FIG. 11, during shipment of the forms 110 shown in FIGS. 8-10, removable blocking 210 is inserted into compartments 120 between the adjacent sides 212, 214 that form the slabs 132. The blocking 210 can be left in place during pouring of the settable material, and then removed before the poured material sets. The blocking 210 may extend substantially a length of each compartment 120 and provide support against the settable material such as concrete.

A third embodiment of the present invention will now be described with reference to FIGS. 12-18.

Figure 12:
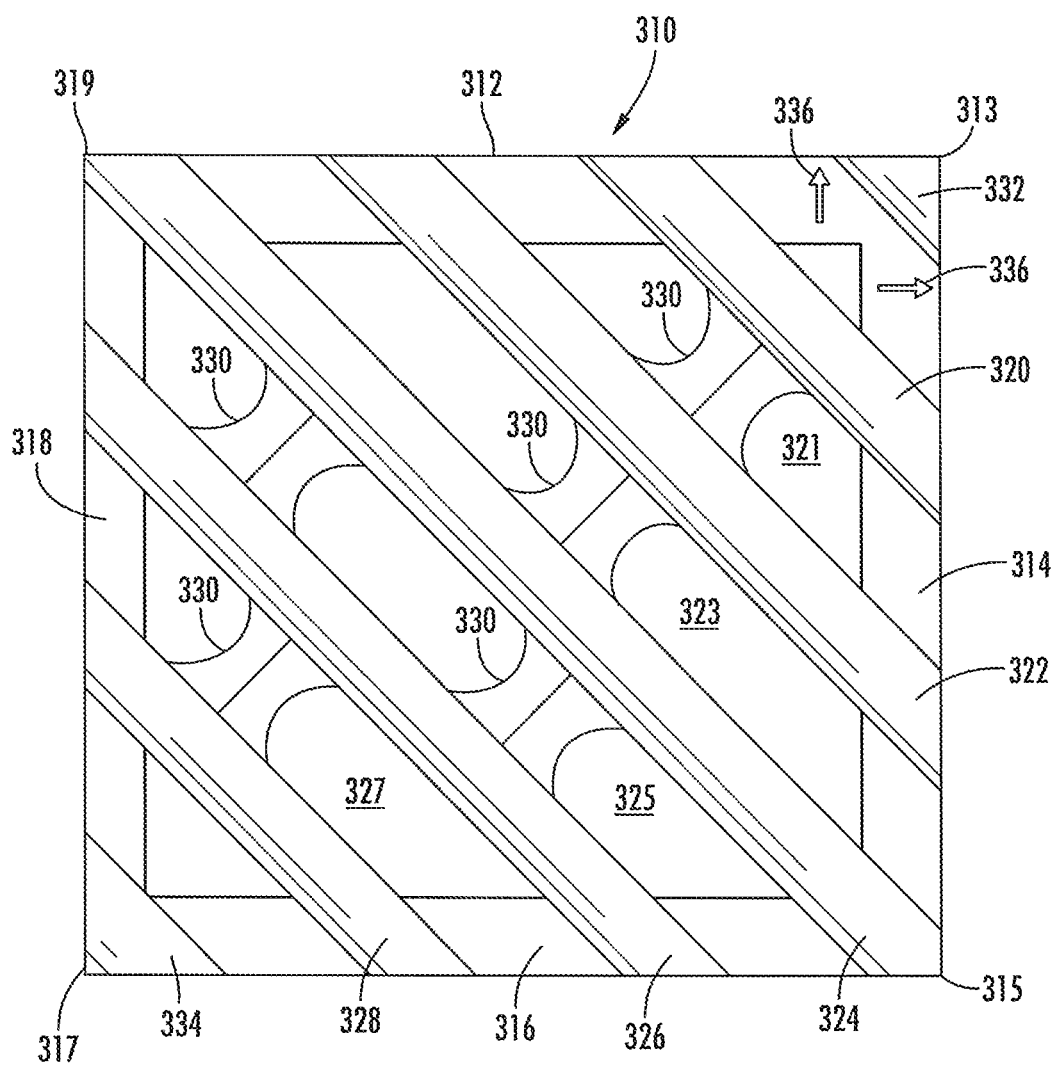
FIG. 12 is a top plan view of a third embodiment of the present invention.

First noting FIG. 12, a basic cattle guard unit 310 in accordance with this embodiment is shown. Cattle guard unit 310 is preferably rectangular in shape and includes side rails 312, 314, 316 and 318 with four corners 313, 315, 317 and 319 between adjacent side rails. A plurality of guard rails 320, 322, 324, 326 and 328 are molded with and extend above the side rails 312, 314, 316 and 318. The guard rails are molded at a substantial angle, preferably 45 degrees, between the side rails 312, 314, 316 and 318 and are separated by stringers 330 so as to define intervening grooves 321, 323, 325 and 327 between adjacent guard rails 320, 322, 324, 326 and 328. The angular disposition of the guard rails permits bicycles, motor cycles, automobiles and trucks to pass across the top of the unit 310 without destructive loading. Additionally, raised areas 332, 334 at respective corners 313, 317 extend approximately to the same height as the guard rails 320, 322, 324, 326 and 328. Directional arrows 336 adjacent one of the raised areas 332 provide assistance in fitting cattle guard units 310 together, as is discussed below with respect to FIGS. 14, 15, 17 and 18.

The manner in which the basic cattle guard units 310 are fitted together to assist in defining a restriction for cattle and other animals in an opening of a fence will now be described with reference to FIGS. 13 and 14.

Figure 13:
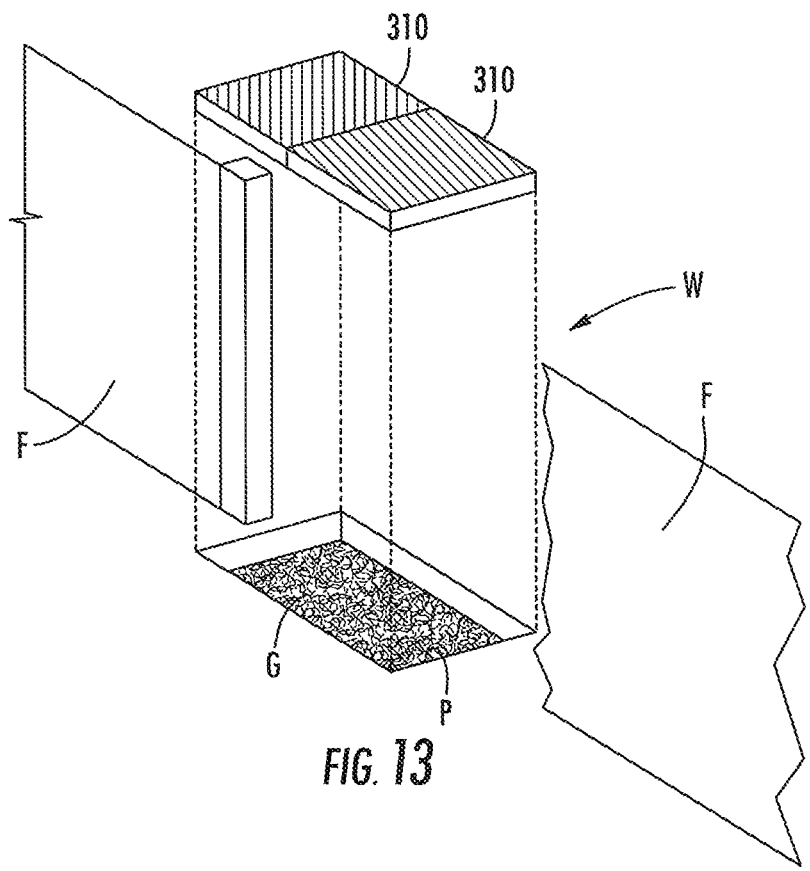
FIG. 13 is a perspective view of an installation of a cattle guard in accordance with the third embodiment, with two units of FIG. 12 installed in a side-by-side configuration in a walkway W through a fence F.
Figure 14:
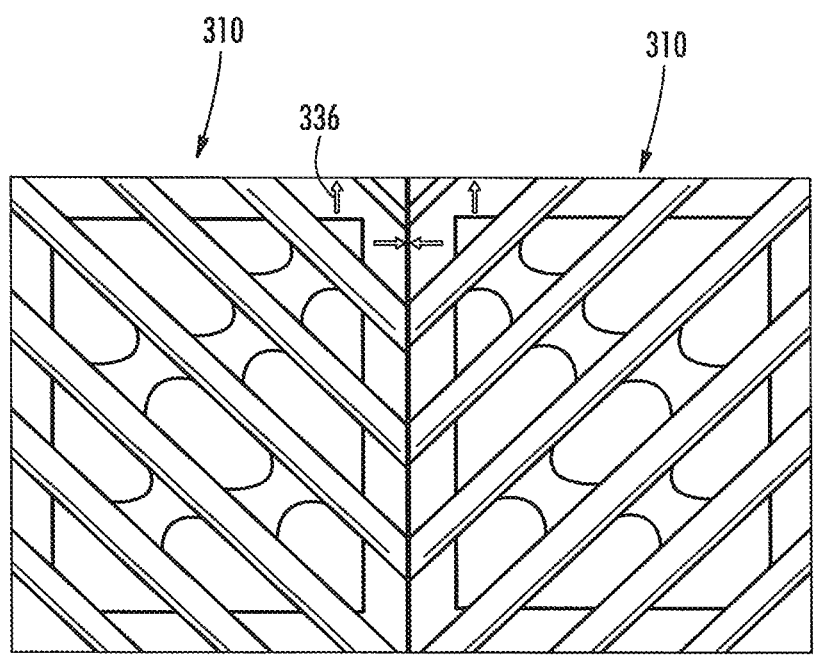
FIG. 14 is a top plan view illustrating the side-by-side installation of FIG. 12 construction into the walkway of FIG. 13.
Figure 15:
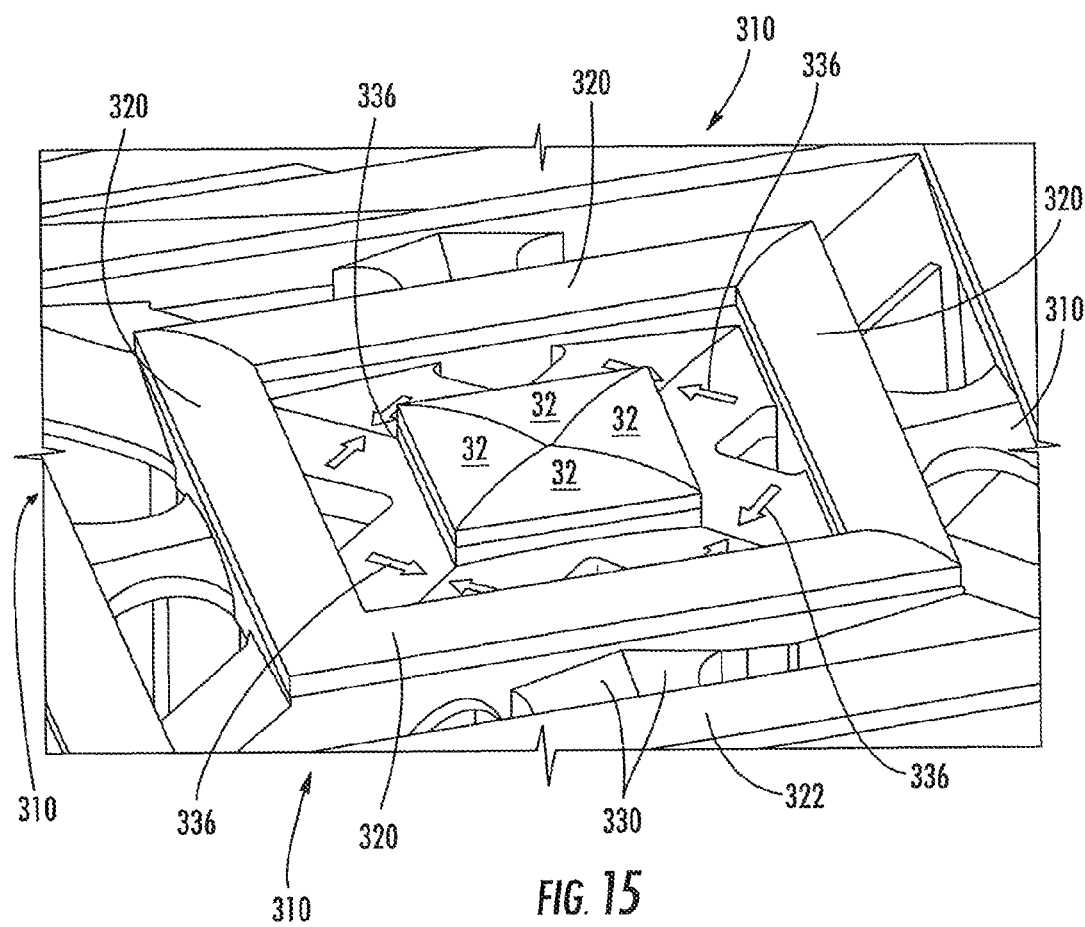
FIG. 15 is a partial perspective view of a portion of a construction illustrating details of a cattle guard construction utilizing multiple units like that shown in FIG. 12.

First noting FIG. 13, a fence F is provided with an opening defining a walkway W. A pit P is extended into the ground in the opening of the walkway W, and preferably gravel G is placed across the bottom of the pit P. Thereafter, one of more of the cattle guard units 310 are placed into the pit P to restrict the movement of cattle and other animals through the fence F along the walkway W. In the example of FIGS. 13 and 14, this is achieved by fitting two of the cattle guard units 310 in the pit P. Noting FIG. 15, it is first observed that the guard rails (for example guard rails 320 in FIG. 15) extend above the level of the guard rails 312, 314, 316 and 318 with the corner raised areas 332 of each cattle guard unit 310 fitting together. The arrows 336 help guide the installation of the cattle guard units 310 in the desired manner.

Figure 16:
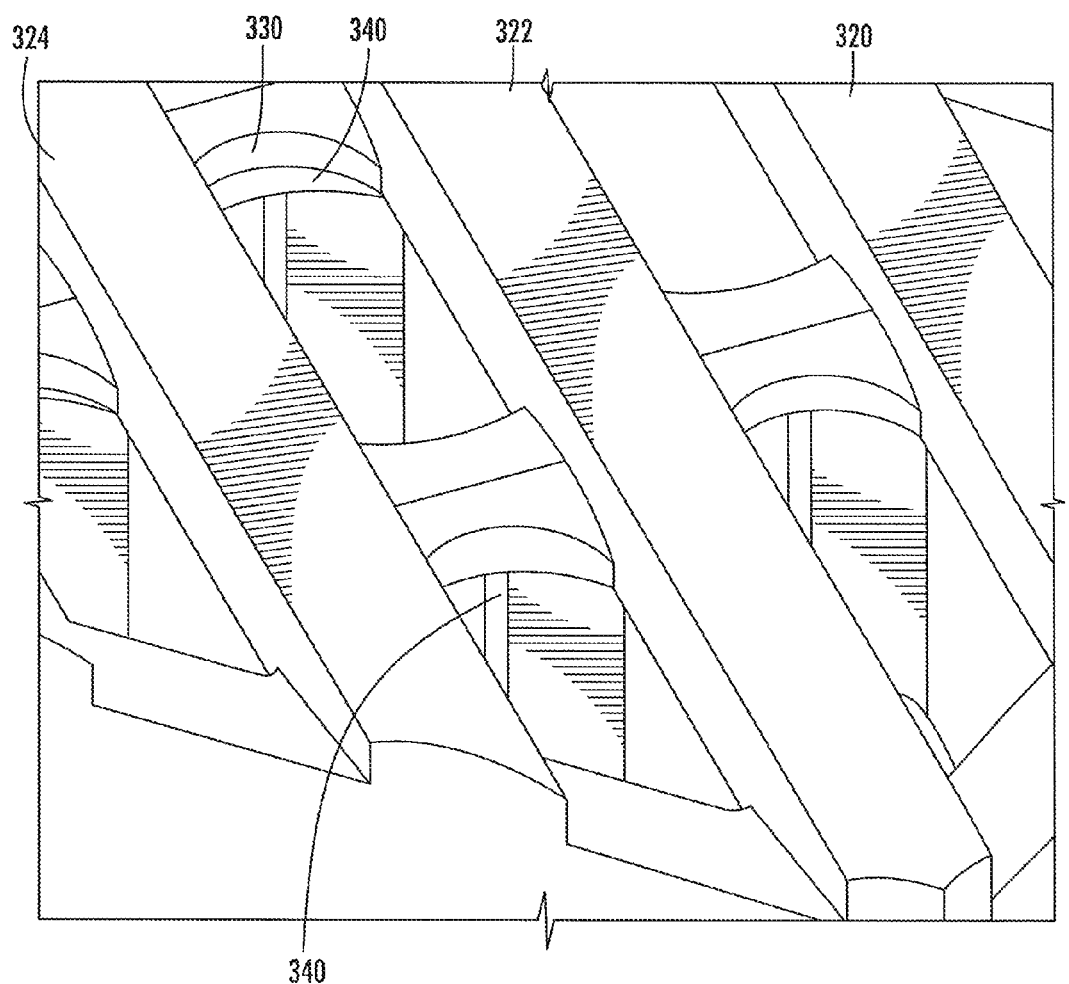
FIG. 16 is a partial perspective view of the construction of FIG. 12, illustrating certain construction details.

Noting FIG. 16, a drain hole 340 is preferably placed in each of the stringers 330 so that the molded plastic cattle guard units do not float when a volume of water fills the pit P of FIG. 13.

Figure 17:
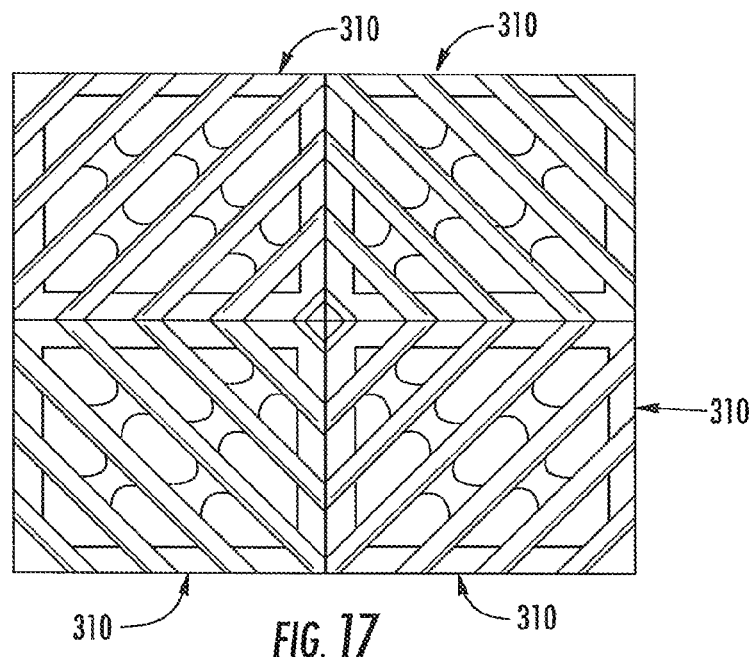
FIGS. 17 and 18 are top plan views, respectively, of four unit and eight unit constructions utilizing the basic unit of FIG. 12.
Figure 18:
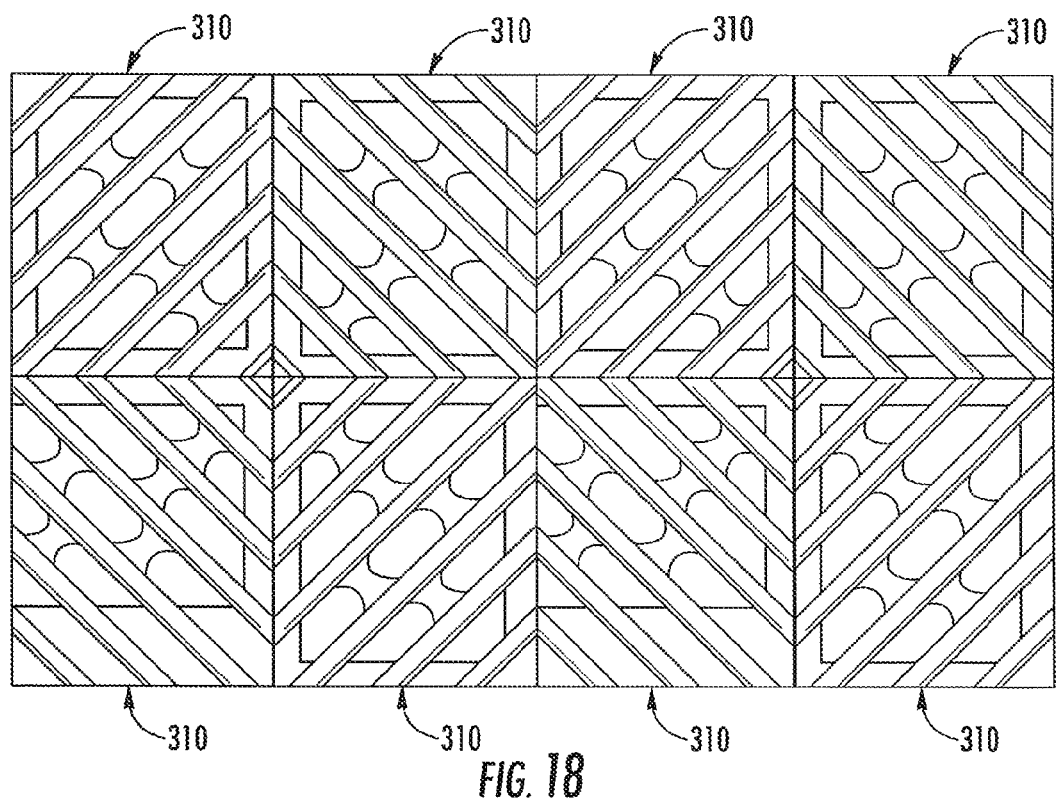

Other construction configurations of the third embodiment invention are shown in FIG. 17, which illustrates a use of four cattle guard units 310 in a larger size. Likewise, FIG. 18 illustrates an eight unit construction for an even larger cattle guard installation.

While the invention has been described with respect to certain specific embodiments, it will be appreciated that many modifications and changes may be made by those skilled in the art without departing from the spirit of the invention. It is intended, therefore, that the appended claims cover all such modifications and changes as fall within the true spirit and scope of the invention.

What is claimed is:

1. A method for fabricating a livestock guard, the method comprising:
    excavating a pit at a predetermined location to provide a barrier to livestock;
    installing a form unit having a plurality of rails into the pit; and
    filling a hollow interior of the plurality of rails with concrete through a plurality of openings disposed in a top surface of each of the plurality of rails.

2. The method of claim 1, wherein a longitudinal cavity is formed between each rail of the plurality of rails having downwardly convergent sides.

3. The method of claim 2, further comprising providing structural support to the rails when filling with concrete by inserting blocking in each longitudinal cavity between the adjacent rails and removing the blocking after filling the rails with concrete.

4. The method of claim 2, further comprising:
    placing blocking at each of the longitudinal cavities formed between the adjacent rails to prevent the concrete from entering the longitudinal cavities when filling; and
    removing the blocking after filling the rails with concrete.

5. The method of claim 1, further comprising installing reinforcing rods within the hollow interior of each rail before filling with the concrete.

6. The method of claim 5, further comprising suspending the reinforcing rods within the hollow interiors of the rails using a plurality of fittings disposed within interior surfaces of the rails.

7. The method of claim 5, wherein the form unit is comprised of high impact polystyrene.

* * * * *